(12) United States Patent
Xie et al.

(10) Patent No.: US 11,844,662 B2
(45) Date of Patent: Dec. 19, 2023

(54) DENTITION MOVEMENT TRACK INDICATOR AND MANUFACTURING METHOD OF INTRA-ORAL FIXATION ASSEMBLY THEREOF

(71) Applicants: Nan Jing Ningdong Digital Technology Co., Ltd., Jiangsu (CN); Lizhe Xie, Jiangsu (CN)

(72) Inventors: Lizhe Xie, Jiangsu (CN); Yining Hu, Jiangsu (CN); Weiwei Li, Jiangsu (CN); Mingwei Li, Jiangsu (CN); Hao Wang, Jiangsu (CN)

(73) Assignees: Nan Jing Ningdong Digital Technology Co., Ltd., Jiangsu (CN); Lizhe Xie, Jiangsu (CN)

( * ) Notice: Subject to any disclaimer, the term of this patent is extended or adjusted under 35 U.S.C. 154(b) by 411 days.

(21) Appl. No.: 17/043,727

(22) PCT Filed: Nov. 2, 2019

(86) PCT No.: PCT/CN2019/115171
§ 371 (c)(1),
(2) Date: Sep. 30, 2020

(87) PCT Pub. No.: WO2020/098515
PCT Pub. Date: May 22, 2020

(65) Prior Publication Data
US 2021/0137664 A1    May 13, 2021

(30) Foreign Application Priority Data
Nov. 14, 2018 (CN) .......................... 201811354273.0

(51) Int. Cl.
*A61C 19/05* (2006.01)
*A61C 19/045* (2006.01)
*A61C 13/097* (2006.01)

(52) U.S. Cl.
CPC .......... *A61C 19/052* (2013.01); *A61C 13/097* (2013.01); *A61C 19/045* (2013.01); *A61C 2201/002* (2013.01)

(58) Field of Classification Search
CPC ........................... A61C 19/045; A61C 19/052
See application file for complete search history.

(56) References Cited

U.S. PATENT DOCUMENTS

| | | | | |
|---|---|---|---|---|
| 5,989,023 A | * | 11/1999 | Summer | A61C 19/045 433/69 |
| 2003/0204150 A1 | * | 10/2003 | Brunner | A61B 5/1127 600/590 |
| 2009/0311647 A1 | * | 12/2009 | Fang | A61C 19/045 433/24 |

FOREIGN PATENT DOCUMENTS

| | | | | |
|---|---|---|---|---|
| BE | 1003824 A6 | * | 6/1992 | .......... A61C 19/045 |
| CN | 1758884 | | 4/2006 | |

(Continued)

OTHER PUBLICATIONS

"International Search Report (Form PCT/ISA/210) of PCT/CN2019/115171," dated Jan. 31, 2020, pp. 1-6.

*Primary Examiner* — Heidi M Eide
(74) *Attorney, Agent, or Firm* — JCIP GLOBAL INC.

(57) ABSTRACT

The invention provides a dentition movement track indicator and a tracing method. The device includes an intra-oral fixation assembly and an extra-oral movement indicating assembly, wherein the intra-oral fixation assembly includes a lower denture base, a left side retention steel wire, a right side retention steel wire and a positioning steel wire. The lower denture base is arranged on the lingual side of the lower dentition and respectively extends from a lower incisor to the far center of the last tooth on the left side and the right side and clings to the lingual mucous membrane. The left side retention steel wire and the right side retention (Continued)

steel wire are distributed in a left-right symmetry mode. The extra-oral movement indicating assembly includes a connecting rod, an arc rod, an indicating plate and a plurality of rectangular parallelepiped thin rods. According to the dentition movement track indicator, an intra-oral fixation assembly.

6 Claims, 4 Drawing Sheets

(56) References Cited

FOREIGN PATENT DOCUMENTS

| | | | | |
|---|---|---|---|---|
| CN | 103690173 | | 4/2014 | |
| CN | 105012038 | | 11/2015 | |
| CN | 106821517 | | 6/2017 | |
| CN | 106875432 | | 6/2017 | |
| CN | 106923917 | | 7/2017 | |
| CN | 107405187 | | 11/2017 | |
| CN | 109480781 | | 3/2019 | |
| CN | 109771070 | | 5/2019 | |
| CN | 213283527 U | * | 5/2021 | |
| DE | 202005010987 U1 | * | 11/2005 | ........... A61C 19/045 |
| KR | 20100022100 | | 2/2010 | |

* cited by examiner (a) Coded as 000001  (b) Coded as 100001  (c) Coded as 000111

Numbered as 1  Numbered as 33  Numbered as 7

DENTITION MOVEMENT TRACK INDICATOR AND MANUFACTURING METHOD OF INTRA-ORAL FIXATION ASSEMBLY THEREOF

CROSS-REFERENCE TO RELATED APPLICATION

This application is a 371 of international application of PCT application serial no. PCT/CN2019/115171, filed on Nov. 2, 2019, which claims the priority benefit of China application no. 201811354273.0, filed on Nov. 14, 2018. The entirety of each of the above mentioned patent applications is hereby incorporated by reference herein and made a part of this specification.

BACKGROUND

Technical Field

The invention relates to a dentition movement track indicator and tracing method.

Description of Related Art

The movement of the dentition is closely related to the healthy coordination of the function and structure of the oral and maxillofacial system. Analysis and observation of dentition movement is an important basis for dental diagnosis, implant restoration planning, orthodontic treatment planning and the evaluation of surgical effect.

However, at the present stage, the analysis of dentition movement mainly depends on the clinical examination of physicians, the reproduced model of the patient's intra-oral dentition and various imaging data of the patient's dentition in a static state. In clinical examinations, the movement of the dentition is difficult to be clearly exposed to the physician's field of view due to the shielding of the soft tissues of the lips. Meanwhile, the movement of the dentition is a complex dynamic process so that the movement of the dentition of a patient cannot be visually and accurately displayed through the clinical examination by a physician and the reproduced model of the patient's intra-oral dentition, and the continuous movement track of the dentition cannot be displayed through image analysis in a static state. Therefore, as the clinical examination of dentition movement track is still not visual, physicians often need to rely on clinical diagnosis and treatment experience and reproduced models of the dentition combined with multiple static dentition images to infer the true movement track of the dentition, making its accuracy difficult to ensure.

The prior Chinese patent application CN201710139518.7 discloses a temporomandibular joint movement reconstruction method and system. A polished retainer is used for fixing a round wire, wherein the contact area of the round wire and the polished retainer is limited, making the round wire easy to fall off; a retainer is worn in the mouth and the retainer covers the occlusal surface of the upper and lower dentition, so that the upper and lower dentition cannot be directly occluded, a certain vertical distance (the material thickness of the retainer) exists, and the movement of the dentition cannot be accurately displayed.

Therefore, it is particularly important to design an indicator device that can trace the track of the dentition movement in conjunction with optical equipment.

SUMMARY

The invention aims to provide a dentition movement track indicator and a tracing method, which can trace the dentition movement track in the oral cavity outside the mouth, overcome the defect that the dentition movement track cannot be directly observed, and solve the problem that the dentition movement cannot be accurately displayed in the prior art.

The technical solution of the invention is as follows.

A dentition movement track indicator is disclosed, including an intra-oral fixation assembly and an extra-oral movement indicating assembly.

The intra-oral fixation assembly includes a lower denture base, a left side retention steel wire, a right side retention steel wire and a positioning steel wire, wherein the lower denture base is arranged on the lingual side of a lower dentition and extends from a lower incisor to the far center of the last tooth on the left side and the right side respectively and clings to the lingual mucous membrane; the left side retention steel wire and the right side retention steel wire are distributed in a left-right symmetry mode, and the left side retention steel wire and the right side retention steel wire respectively extend from a left end and a right end of the lower denture base, and the left side retention steel wire and the right side retention steel wire respectively extend from a far center of a second molar of a mandible to the near center of a buccal neck undercut area of a first molar of the mandible; one end of the positioning steel wire extends out of the lower denture base, extending from an adjacent gap between a first premolar tooth and a canine tooth on one side to a labial surface of a canine tooth on one side, and continuing to extend to an adjacent gap between a first premolar tooth and a canine tooth on the other side clinging to a middle area of a labial surface of an anterior tooth, and the positioning steel wire continues to extend and be embedded in the lower denture base.

The extra-oral movement indicating assembly includes a connecting rod, an arc rod, an indicating plate and a plurality of rectangular parallelepiped thin rods, wherein a pair of connecting rods with equal lengths extend to corners of a mouth at positions of a canine tooth on two sides of a mandible, one end of the connecting rod is connected to the positioning steel wire, the other end of the connecting rod is connected to the arc rod, the arc rod is provided with a plurality of first nut holes, a first screw is arranged on a side surface of the rectangular parallelepiped thin rod, the first screw of the rectangular parallelepiped thin rod and the first nut hole are linked in a one-to-one correspondence mode, the other side surface of the rectangular parallelepiped thin rod is provided with a second screw, the indicating plate is provided with a second nut hole, and the second screw of the rectangular parallelepiped thin rod is linked with the second nut hole.

Further, the arc rod is formed by bending a rectangular parallelepiped with a square sectional area, and the arc rod is arranged in a direction protruding away from the connecting rod.

Further, the first screw and the second screw are respectively arranged on two opposite or adjacent side surfaces of the rectangular parallelepiped thin rod.

Further, the indicating plate is provided with a coded marker.

Further, the indicating plate is made of a square light material, and the coded marker is printed in color.

Further, the coded marker is provided with a coded flag that adopts black as a background and white as foreground color, wherein the coded flag includes a square flag, a circular large circle flag, a circular small circle flag and a circular ring flag, the coded marker is square, and a square flag, a circular large circle flag, a circular small circle flag and a circular ring flag are respectively arranged at four corners of the coded marker.

Further, the decoding process of the coded flag includes the following specific steps of:

Step 1, positioning a coded marker, wherein the coded marker is positioned according to the black background of the coded flag and the characteristics of a square flag;

Step 2, positioning a square flag pattern with a white foreground color in the coded flag;

Step 3, aligning the coded marker according to the position of the white square flag pattern, and areas where the circular large circle flag, the circular small circle flag and the circular ring flag are located being respectively divided into three coding areas according to the position of the square flag, namely area 1, area 2 and area 3;

Step 4, coding based on the circular large circle flag, the circular small circle flag and the circular ring flag, wherein the large circle flag is coded as 01, the small circle flag is coded as 10, the circular ring flag is coded as 11, and the coding area is coded as 00 when no coded graphics exist; detecting coded graphics in each coding area of the coded marker; and Step 5, decoding each coded flag according to a sequence of the coding areas based on the decoding of the coding areas; with a binary code being preliminarily decoded, a decimal code being further calculated by the binary code, and a serial number of a coded flag being obtained after decoding suitable for multi-flag point matching.

Further, acquiring a sub-pixel central point position of the coded marker by combining an optical tracking technology, wherein the sub-pixel central point position fits a movement track of the dentition; obtaining the sub-pixel central point position of the coded marker specifically includincludes the steps.

Preliminarily determining the central position of a flag according to an outline of the coded marker, wherein the coded marker adopts a square of a black background, and the central position of the coded marker is calculated according to four corner positions; and Two small squares being arranged in the center of the coded marker, and one chessboard corner point being formed at an intersection point of the two small squares in the center of the coded marker; pixels around the central position of the flag preliminarily determined in the previous step being further searched for the sub-pixel position of the chessboard corner point, which is the sub-pixel central position of the coded marker.

Further, the intra-oral fixation assembly is manufactured by the following steps of:

S1, selecting a tray, preparing an upper and lower dentition female mold of a research object by using an alginate impression material, wherein matching with functional muscle trimming is required in the process;

S2, pouring a male mold of the upper and lower dentition with die stone to obtain the intra-oral dentition condition of a patient so as to bend the intra-oral fixation assembly of a tracing device;

S3, bending a steel wire to a required shape to obtain the left side retention steel wire, the right side retention steel wire and the positioning steel wire respectively, and fixing a position where the left side retention steel wire, the right side retention steel wire and the positioning steel wire are in contact with teeth by using wax; and S4, coating a separating agent, filling plastic between the positioning steel wire and the mold, carrying out polishing after the plastic is solidified, and removing flash and occlusion high points to obtain the lower denture base.

The invention discloses a dentition movement track tracing method, wherein after a patient wears any of the dentition movement track indicator mentioned above, optical acquisition equipment is used for acquiring an opening and closing mouth movement of a patient, namely slowly opening the mouth to the maximum and slowly closing the mouth, wherein lip muscle relaxation is guaranteed when the mouth is closed; a sub-pixel central point position of a coded flag is acquired by combining an optical tracking technology, and the acquired sub-pixel central point position of the coded flag fits the dentition movement track.

Further, the optical acquisition equipment adopts a single camera, double cameras or a plurality of cameras, wherein the single camera acquires the two-dimensional track of the dentition movement, and the double cameras or the plurality of cameras acquire the three-dimensional track of the dentition movement by combining the stereoscopic vision technology.

The invention has beneficial effects as follows.

1. According to the dentition movement track indicator and the tracing method, an intra-oral fixation assembly that does not need to be bonded is adopted and relies on the lower denture base to contact the natural undercut in the mouth, making the contact area large; the left side retention steel wire and the right side retention steel wire on the lower denture base are fixedly arranged on the dentition, making loosening and falling difficult and the stability good.

2. According to the dentition movement track indicator and the tracing method, an intra-oral fixation assembly which is adaptive to individual dentition conditions and personalized and does not cover the occlusal surface of the upper and lower dentition is adopted. Therefore, when the dentition movement is being acquired, the occlusal surfaces of the upper dentition and the lower dentition can be directly contacted, a vertical gap does not exist between the upper dentition and the lower dentition, the movement process of the dentition is accurately transferred, and the trace of the movement track is not influenced.

3. According to the invention, in the innovative design of the intra-oral fixation assembly, the lower denture base is adopted to increase the retention force, so that the area for covering the dentition is small, the foreign body feeling of a patient can be reduced, the comfort level is improved, and the accuracy and stability of dentition movement acquisition are guaranteed.

4. According to the invention, in the innovative design of the intra-oral fixation assembly, the left side retention steel wire and the right side retention steel wire are adopted to wrap the tooth to increase the retention force, so that a retention device does not need to be bonded on the tooth surface, it is convenient to take off and wear the fixation assembly, and after the acquisition of dentition movement, there is no need to remove the bonding material and it is non-invasive to the tooth.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The preferred embodiments of the present invention will be described in detail below with reference to the accompanying drawings.

Embodiments

Figure 1:
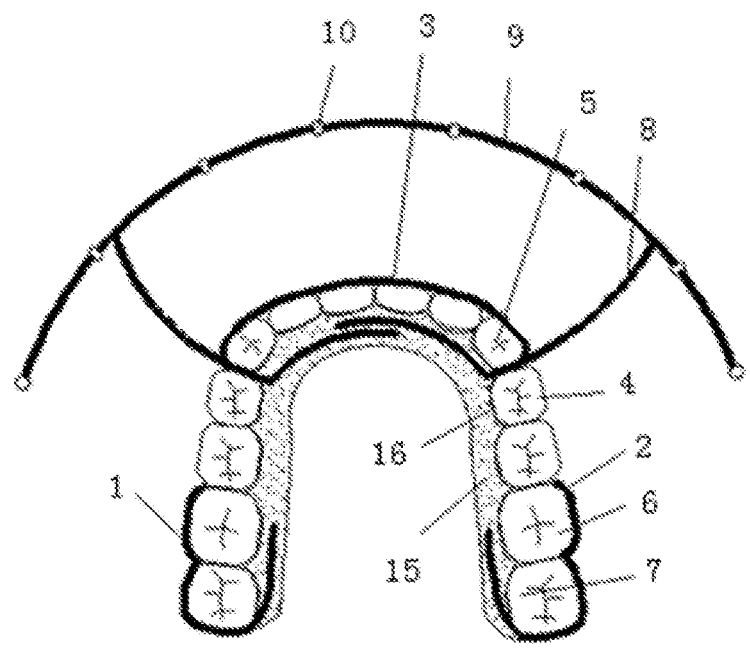
FIG. 1 is a schematic structural view of a dentition movement track indicator according to an embodiment of the present invention.
Figure 2:
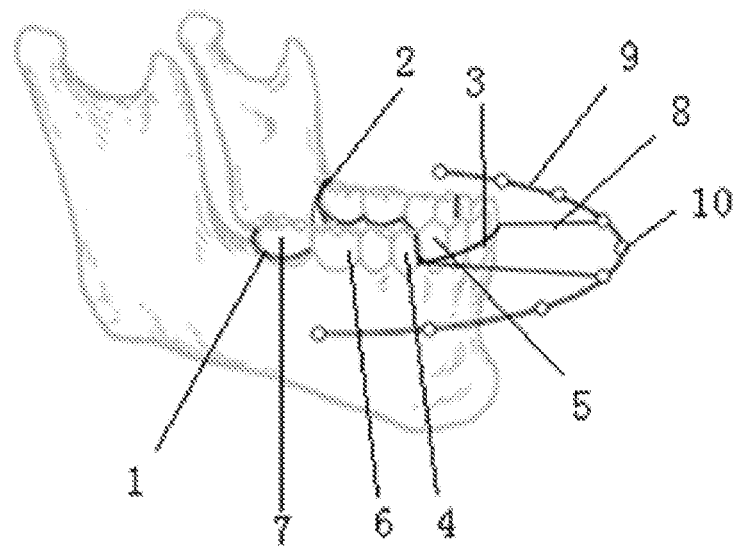
FIG. 2 is a schematic view showing a three-dimensional structure of a dentition movement track indicator according to an embodiment.

A dentition movement track indicator, as shown in FIGS. 1 and 2, includes an intra-oral fixation assembly and an extra-oral movement indicating assembly.

The intra-oral fixation assembly includes a lower denture base 15, a left side retention steel wire 1, a right side retention steel wire 2 and a positioning steel wire 3, wherein the lower denture base 15 is arranged on the lingual side of the lower dentition and extends from a lower incisor to the far center of the last tooth on the left side and the right side respectively and clings to the lingual mucous membrane; the left side retention steel wire 1 and the right side retention steel wire 2 are distributed in a left-right symmetry mode, and the left side retention steel wire 1 and the right side retention steel wire 2 respectively extend from the left end and the right end of the lower denture base 15, and the left side retention steel wire 1 and the right side retention steel wire 2 respectively extend from an adjacent gap of first molar 6 and the second molar 7 of the mandible to the middle of the undercut area of the buccal neck of the first molar 6 of the mandible; one end of the positioning steel wire 3 extends out of the lower denture base 15, extending from the adjacent gap between the first premolar tooth 4 and the canine tooth 5 on one side to the labial surface of the canine tooth 4 on one side, and continuing to extend to the adjacent gap between the first premolar tooth 4 and the canine tooth 5 on the other side close to the middle area of the labial surface of the anterior tooth, and the positioning steel wire 3 continues to extend and be embedded in the lower denture base 15.

Figure 6:
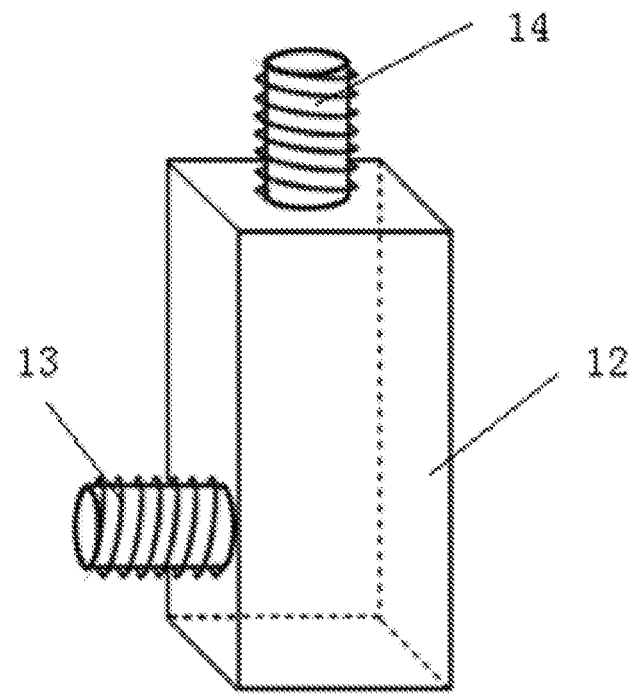
FIG. 6 is a schematic structural view of a rectangular parallelepiped thin rod, a first screw and a second screw according to an embodiment.

The extra-oral movement indicating assembly includes a connecting rod 8, an arc rod 9, an indicating plate and a plurality of rectangular parallelepiped thin rods 12, wherein a pair of connecting rods 8 with the same length extend towards the corner of the mouth at the canine tooth 4 on both sides of the mandible, one end of a connecting rod 8 is connected to the positioning steel wire 3, the other end of the connecting rod 8 is connected to the arc rod 9 and the arc rod 9 is provided with a plurality of first nut holes 10, preferably 8. As shown in FIG. 6, a first screw 13 is arranged on the side surface of the rectangular parallelepiped thin rod 12, the first screw 13 of the rectangular parallelepiped thin rod 12 is linked with the first nut hole 10 in a one-to-one correspondence mode, a second screw 14 is arranged on the other side surface of the rectangular parallelepiped thin rod 12, a second nut hole is formed in the indicating plate, and the second screw 14 of the rectangular parallelepiped thin rod 12 is linked with the second nut hole.

According to the dentition movement track indicator, an intra-oral fixation assembly that does not need to be bonded is adopted and relies on the lower denture base 15 to contact the natural undercut in the mouth, making the contact area large; the left side retention steel wire 1 and the right side retention steel wire 2 on the lower denture base 15 are fixedly arranged on the dentition, making loosening and falling difficult and the stability good.

As shown in FIG. 2, the left side retention steel wire 1 extends from the left end of the lower denture base 15, and the left side retention steel wire 1 extends from the far center of the left mandibular second molar 7 to the near center of the buccal neck undercut region of the mandibular first molar 6 on the same side; the right side retention steel wire 2 extends from the right end of the lower denture base 15, and the right side retention steel wire 2 extends from the distal center of the right mandibular second molar 7 to the near center of the buccal neck undercut region of the mandibular first molar 6 on the same side. The undercut region is an area below the connecting line of the most protruding points of the tooth surface.

In the embodiment, the left side retention steel wire 1 and the right side retention steel wire 2 may not be connected with the two ends of the positioning steel wire 3, so that the left side retention steel wire 1, the right side retention steel wire 2 and the positioning steel wire 3 can be respectively bent, the manufacture is more convenient, the installation does not interfere with each other, the use amount of the steel wire can be saved, and the positioning of the left side retention steel wire 1 and the right side retention steel wire 2 and the positioning wire 3 can be realized by the lower denture base 15 made of embedding material.

According to the dentition movement track indicator, an intra-oral fixation assembly that is adaptive to individual dentition conditions and personalized and does not cover the occlusal surface of the upper and lower dentition is adopted. Therefore, when the dentition movement is being acquired, the occlusal surfaces of the upper dentition and the lower dentition can be directly contacted, a vertical gap does not exist between the upper dentition and the lower dentition, the movement process of the dentition is accurately transferred, and the trace of the movement track is not influenced.

In the embodiment, the arc rod 9 is formed by bending a rectangular parallelepiped with a square sectional area, and the arc rod 9 is arranged in a direction protruding away from the connecting rod 8. The embodiment further includes an indicating plate, wherein the indicating plate is provided with a second nut hole, and the rectangular parallelepiped thin rod 12 is linked with the second nut hole. The indicating board is provided with a coded marker 11. The indicating board is square, and the coded marker 11 is made of light materials.

Figure 3:
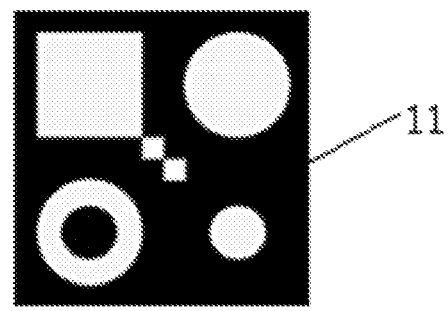
FIG. 3 is a schematic structural view of a coded marker and a coded flag according to an embodiment.

As shown in FIG. 3, the coded marker 11 is provided with a coded flag that adopts black as a background and white as a foreground color. The coded flag includes a square flag, a circular large circle flag, a circular small circle flag and a circular ring flag. The coded marker 11 is square, and a square flag, a circular large circle flag, a circular small circle flag and a circular ring flag are respectively arranged at four corners of the coded marker 11.

Figure 4:
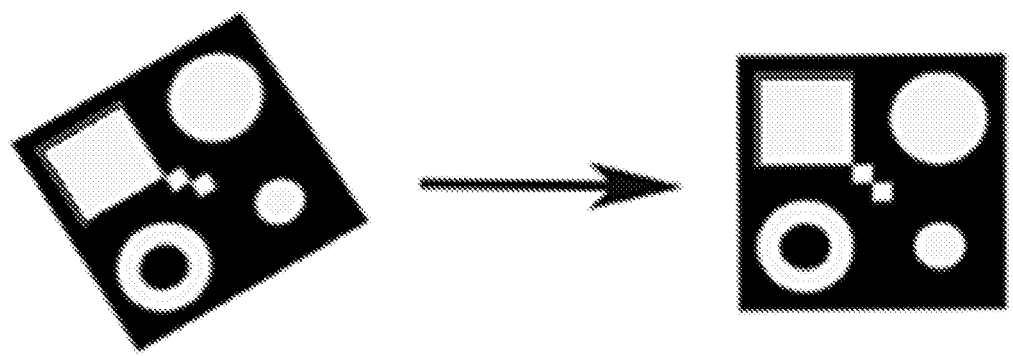
FIG. 4 is a schematic view illustrating coded flag positioning according to an embodiment.
Figure 5:
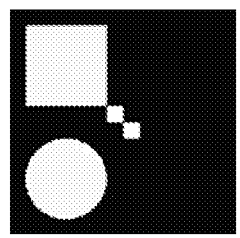
FIG. 5 is a schematic view illustrating a coding example according to an embodiment.
Figure 5:
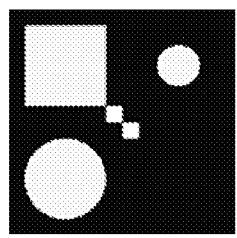
Figure 5:
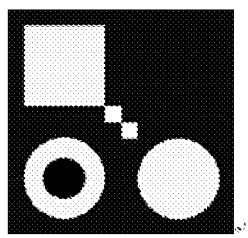
Figure 7:
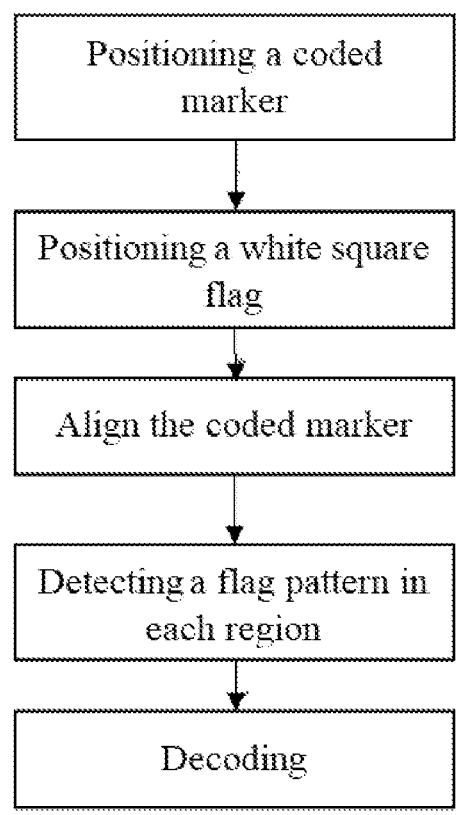
FIG. 7 is a schematic view of a decoding process for a coded flag according to an embodiment.

In the dentition movement track indicator, as shown in FIGS. 4, 5 and 7, the decoding process of the coded flag includes the following specific steps of:

Step 1, positioning a coded marker 11, wherein the coded marker 11 is positioned according to the black background of the coded flag and the characteristics of the square flag;

Step 2, positioning a square flag pattern with a white foreground color in the coded flag;

Step 3, aligning the coded marker 11 according to the position of the white square flag pattern, and the areas where the circular large circle flag, the circular small circle flag and the circular ring flag are located being respectively divided into three coding areas according to the position of the square flag, wherein as shown in FIG. 3, an area 1 is arranged on the right side of the square flag, an area 2 is arranged on the diagonal position of the square flag, i.e. the flag pattern of the lower right corner of the flagged object, and an area 3 is arranged below the square flag;

Step 4, coding based on the circular large circle flag, the circular small circle flag and the circular ring flag, wherein the large circle flag is coded as 01, the small circle flag is coded as 10, the circular ring flag is coded as 11, and the coding area is coded as 00 when no coded pattern exists; detecting a coded pattern in each coding area of the coded marker 11; and Step 5, decoding each coded flag according to the sequence of the coding areas based on the decoding of the coding areas; with a binary code being preliminarily decoded, a decimal code being further calculated by the binary code, and a serial number of a coded flag being obtained after decoding suitable for multi-flag point matching.

Further, acquiring a sub-pixel central point position of the coded marker by combining an optical tracking technology, wherein the sub-pixel central point position fits a movement track of the dentition; obtaining the sub-pixel central point position of the coded marker 11 specifically including:

Preliminarily determining the central position of a flag according to the outline of the coded marker 11, wherein the coded marker 11 adopts a square of a black background and calculates the central position of the coded marker according to four corner positions; and Two small squares being arranged in the center of the coded marker 11, and a chessboard corner point being formed at the intersection point of the two small squares in the center of the coded marker 11; the pixels around the central position of the flag preliminarily determined in the previous step being further searched for the sub-pixel position of the chessboard corner point, which is the sub-pixel central position of the coded marker 11.

In an embodiment, the intra-oral fixation assembly is manufactured by the following steps of:

S1, selecting a tray, preparing an upper and lower dentition female mold of a research object by using an alginate impression material, wherein matching with functional muscle trimming is required in the process;

S2, pouring the male mold of the upper and lower dentition with die stone to obtain the intra-oral dentition condition of the patient so as to bend the intra-oral fixation assembly of the tracing device;

S3, bending a steel wire to a required shape to obtain a left side retention steel wire 1, a right side retention steel wire 2 and a positioning steel wire 3 respectively, and fixing the position where the left side retention steel wire 1, the right side retention steel wire 2 and the positioning steel wire 3 are in contact with teeth by using wax; and S4, coating a separating agent, filling plastic between the positioning steel wire 3 and the mold, carrying out polishing after the plastic is solidified, and removing flash and occlusion high points to obtain the lower denture base 15.

In the embodiment, the lower denture base 15 is U-shaped, so that the interference to the tongue is reduced when the lower denture base 15 is used, and comfort is improved when the lower denture base 15 is used. The lower denture base 15 can adopt a U shape, which can save materials while ensuring the stability of the overall structure fixation. And the attached tooth sides of the lower denture base 15 are respectively provided with arc grooves 16 for being attached to the teeth, so that the lower denture base 15 is tightly attached to the lingual sides of the teeth by arranging the arc grooves 16, and good positioning is realized.

In the embodiment, the length of the arc rod 9 is preferably 15 cm, the arc rod 9 is formed by bending a rectangular parallelepiped, the sectional area of the rectangular parallelepiped is square with a side length of about 3-4 mm, and eight nut holes are uniformly distributed on the arc rod 9. The length of the rectangular parallelepiped thin rod 12 is preferably 3 cm, and the sectional area of the rectangular parallelepiped thin rod 12 is square with a preferable side length of 3 mm. Nuts are respectively arranged at two ends of the rectangular parallelepiped thin rod 12, wherein the nuts at the two ends are at right angles to the rectangular parallelepiped thin rod 12, and the rectangular parallelepiped thin rod 12 is linked with the arc rod 9 through nut holes.

The area of the indicating plate is preferably 2 cm 2 cm, the center of the back of the indicating plate is provided with a nut hole to be connected with the rectangular parallelepiped thin rod 12, and the front part of the indicating plate is relatively flat so that the coded marker 11 can conveniently adhere.

The invention discloses a dentition movement track tracing method, wherein after a patient wears any dentition movement track indicator mentioned above, optical acquisition equipment is used for acquiring the opening and closing mouth movement of the patient, namely slowly opening the mouth to the maximum and slowly closing the mouth, wherein lip muscle relaxation is guaranteed when the mouth is closed; the moving track of the center point of the flag pattern is acquired by combining the optical tracking technology.

The optical acquisition equipment adopts a single camera, double cameras or a plurality of cameras, wherein the single camera acquires the two-dimensional track of the dentition movement, and the double cameras or the plurality of cameras acquire the three-dimensional track of the dentition movement by combining the stereoscopic vision technology.

According to the embodiment, in the innovative design of the intra-oral fixation assembly, the lower denture base 15 is adopted to increase the retention force, so that the area for covering the dentition is small, the foreign body feeling of a patient can be reduced, the comfort level is improved, and the accuracy and stability of dentition movement acquisition are guaranteed.

According to the embodiment of the invention, in the innovative design of the intra-oral fixation assembly, the left side retention steel wire and the right side retention steel wire are adopted to increase the retention force, so that a retention device does not need to be bonded on the tooth surface, it is convenient to take off and wear the fixation assembly, and after the acquisition of dentition movement, there is no need to remove the bonding material and it is non-invasive to the tooth.

According to the embodiment, the dentition movement indicating device can be combined with the optical acquisition equipment, wherein the dentition movement track on the two-dimensional plane can be acquired by combining a single camera, and the dentition movement track in the three-dimensional space can be acquired by combining double cameras or a plurality of cameras.

According to the embodiment, the dentition movement tracking can be combined with the intra-oral dentition scanning to establish a digital dentition movement system containing a dentition, so that a physician can visually observe the dentition movement track of a patient and it assists the diagnosis of oral cavity related diseases.

What is claimed is:

1. A dentition movement track indicator, comprising an intra-oral fixation assembly and an extra-oral movement indicating assembly, wherein the intra-oral fixation assembly comprises a lower denture base, a left side retention steel wire, a right side retention steel wire and a positioning steel wire, wherein the lower denture base is configured to be arranged on a lingual side of a lower dentition, configured to extend along an entire inner arch of a user from a last tooth on a left side to a last tooth on a right side and configured to cling to a lingual mucous membrane; the left side retention steel wire and the right side retention steel wire are disposed symmetrically on the lower denture base, the left side retention steel wire and the right side retention steel wire respectively extend from the lower denture base, and the left side retention steel wire and the right side retention steel wire are configured to extend around the second molar to the first molar; one end of the positioning steel wire extends out of the lower denture base, the positioning steel wire is configured to extend from gap between a first premolar tooth and a canine tooth on one side of the dentition to a gap between a first premolar tooth and a canine tooth on the other side of the dentition and configured to cling to a middle area of a labial surface of anterior teeth between the gaps, and the positioning steel wire continues to extend and be embedded in the lower denture base;

the extra-oral movement indicating assembly comprises a pair of connecting rods, an arc rod, an indicating plate and a plurality of rectangular parallelepiped thin rods, wherein the pair of connecting rods with equal lengths are configured to extend to corners of a mouth at positions of the canine teeth on two sides of the mandible, one end of each of the connecting rods is connected to the positioning steel wire, the other end of each of the connecting rods is connected to the arc rod, the arc rod is provided with a plurality of first nut holes, a first screw is arranged on a side surface of the rectangular parallelepiped thin rod, the first screw of the rectangular parallelepiped thin rod and one of the first nut holes are linked in a one-to-one correspondence mode, the other side surface of the rectangular parallelepiped thin rod is provided with a second screw, the indicating plate is provided with a second nut hole, and the second screw of the rectangular parallelepiped thin rod is linked with the second nut hole.

2. The dentition movement track indicator according to claim 1, wherein the arc rod is a bent rectangular parallelepiped with a square sectional area, and the arc rod is arranged in a direction protruding away from the connecting rods.

3. The dentition movement track indicator according to claim 1, wherein the side surface of the rectangular parallelepiped thin rod and the other side surface of the rectangular parallelepiped thin rod are opposite to each other or adjacent to each other.

4. The dentition movement track indicator according to claim 3, wherein the indicating plate is provided with a coded marker.

5. The dentition movement track indicator according to claim 4, wherein the indicator plate is square and made of a light material, and the coded marker is made by color printing.

6. The dentition movement track indicator according to claim 5, wherein the coded marker is provided with a coded flag, the coded marker has a black background, a color of the coded flag is white, wherein the coded flag comprises a square flag, a large circle flag, a small circle flag and a ring flag, the coded marker is square, and the square flag, the large circle flag, the small circle flag and the ring flag are respectively arranged at four corners of the coded marker.

* * * * *